United States Patent [19]

Christie et al.

[11] 4,126,718

[45] Nov. 21, 1978

[54] APPLYING MASTIC ALONGSIDE WELD BEAD

[75] Inventors: Howard W. Christie, Kansas City, Mo.; Walter D. Hodge, Shawnee Mission, Kans.

[73] Assignee: H. C. Price Co.

[21] Appl. No.: 780,837

[22] Filed: Mar. 24, 1977

[51] Int. Cl.² .......................................... B05D 1/40
[52] U.S. Cl. ............................... 427/286; 118/413; 138/171; 427/356
[58] Field of Search ............... 427/286, 287, 264, 356, 427/270, 358; 401/9, 11; 228/199, 114, 216; 29/527.4; 118/105, 108, 123, 405, 410, 413, 415, DIG. 10, DIG. 11, DIG. 13, 125; 264/216, 267, 173, 174; 425/87, 113; 113/120 K, 120 A; 428/61; 219/137; 138/171

[56] References Cited

U.S. PATENT DOCUMENTS

| | | | |
|---|---|---|---|
| 2,454,821 | 11/1948 | McKee | 427/286 X |
| 2,798,456 | 7/1957 | Pearson | 427/286 X |
| 2,927,371 | 3/1960 | Hays | 29/527.4 X |

FOREIGN PATENT DOCUMENTS

| | | | |
|---|---|---|---|
| 218,812 | 7/1957 | Australia | 427/287 |
| 559,012 | 6/1958 | Canada | 427/286 |
| 582,515 | 9/1959 | Canada | 228/37 |

*Primary Examiner*—Morris Kaplan
*Attorney, Agent, or Firm*—Lowe, Kokjer, Kircher, Wharton & Bowman

[57] ABSTRACT

A device and method for applying mastic material to the weld bead area of longitudinally welded pipe is the subject of this application. An extruder is mounted on a framework and receives mastic material in rope form from a bulk spool positioned above the extruder. The extruder incorporates heating elements to raise the temperature of the mastic. The extruder is provided with dual orifices for depositing a layer of the mastic material on either side of the weld bead of the pipe. A doctor blade is mounted to move along the pipe extending from the weld bead to a point on the pipe surface to smooth the mastic material which has been deposited. The doctor blade smooths the material evenly and causes it to form a bridge between the apex of the weld bead and a point on the pipe surface adjacent the base of the weld bead.

3 Claims, 5 Drawing Figures

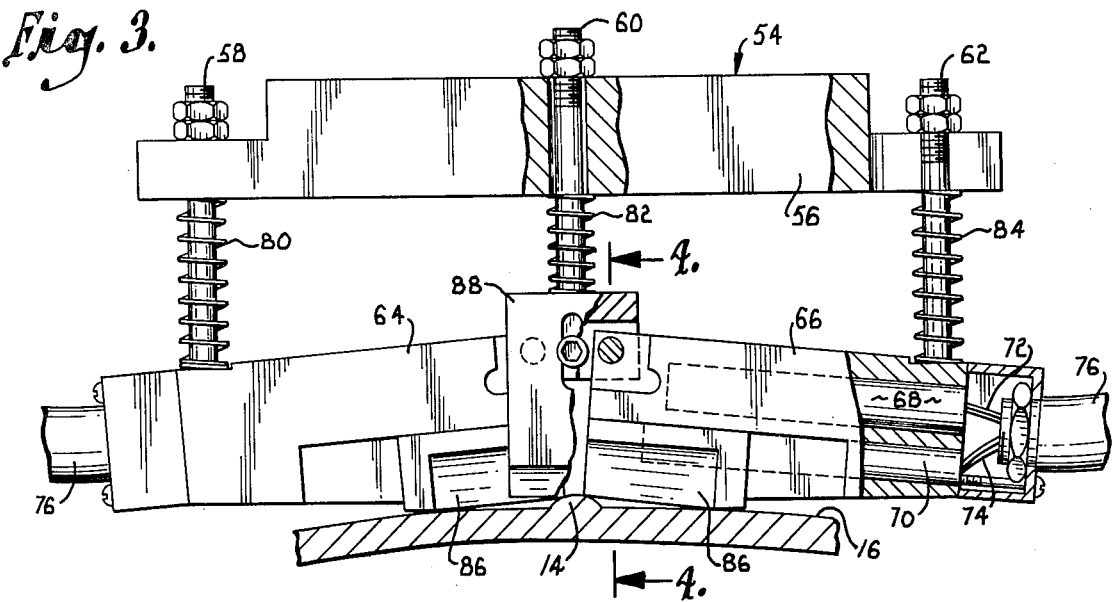
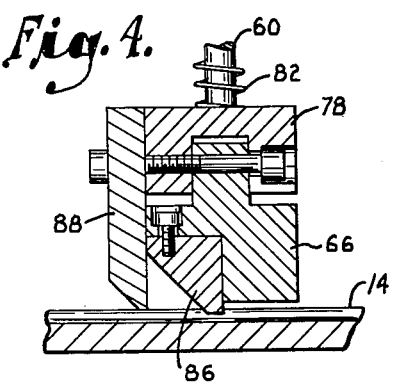
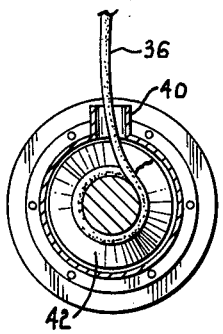

APPLYING MASTIC ALONGSIDE WELD BEAD

BACKGROUND OF THE INVENTION

This invention relates to pipe coating generally and, more particularly, to a method of coating pipe characterized by a longitudinally extending weld seam.

The size of pipe used in construction of pipelines has steadily increased until diameters in the range of 50–60 inches are now common. Pipe of extremely large diameters may presently be formed only through utilization of a longitudinal weld which extends the length of the pipe. The resulting weld bead projects above the remainder of the pipe surface by a distance of up to about ½ inch.

When pipe coating procedures employing side extrusion equipment are utilized for coating longitudinally welded pipe, the weld bead causes special problems. A typical procedure for side extrusion coating of pipe is disclosed in U.S. Pat. No. 3,823,045 issued to Ralph Hielema on July 9, 1974. The techniques heretofore utilized to fill in the area adjacent the weld bead have been to increase the amount of coating material in the area by increasing the speed of the extruder or depositing a powder material on the pipe which is sintered by the heat of the pipe immediately ahead of the extrusion coating application. These techniques are described in detail U.S. Pat. Nos. 3,972,761 and 3,814,646, respectively.

There are several disadvantages to the techniques disclosed in the above referenced patents including difficulty in applying the required amount of filler material, the need to employ relatively expensive and complicated sensing systems, and the limitation of requiring that the pipe be at a high temperature if a sinter coating is to be used. In some instances, it has been found that a superior coating results if the pipe is not heated to the extremes required for sinter coatings but, instead, is at relatively low temperatures in the vicinity of the ambient air when the coating is applied.

It is, therefore, a principal object of the present invention to provide a method of coating the area adjacent the weld bead of longitudinally welded pipe which does not required the pipe to be at high temperatures as a prerequisite to the application process.

Another object of this invention is to provide a method of coating the area adjacent the weld bead of longitudinally welded pipe which does not require expensive sensory equipment for sensing the location of the weld bead as the pipe is rotated.

A further aim of the invention is to provide a method of coating the area of longitudinally welded pipe adjacent the weld bead which may easily be adapted to pipe of different diameter.

Still another object of the invention is to provide a method of coating the area adjacent the weld bead of longitudinally welded pipe which is not affected by minor imperfections in the pipe surface or out-of-round pipe conditions.

It is also an important objective of this invention to provide a method of coating the area adjacent the weld bead of longitudinally welded pipe whereby the area adjacent the weld bead may be coated ahead of an extrusion coating operation so as to preclude the possibility of any interference with the extrusion process.

Other objects of the invention will be made clear or become apparent from the following description and claims, when read in light of the accompanying drawings.

DESCRIPTION OF THE DRAWINGS

FIG. 3 is an enlarged, detail view, taken along line 3—3 of FIG. 1 and illustrating details of the doctor blade and associated mounting structure which smooth the mastic material after it is applied to the pipe;

FIG. 4 is an enlarged, cross-sectional view, taken along line 4—4 of FIG. 3; and FIG. 5 is a cross-sectional view through the extruder, taken along line 5—5 of FIG. 1.

DETAILED DESCRIPTION OF THE INVENTION

Figure 1:
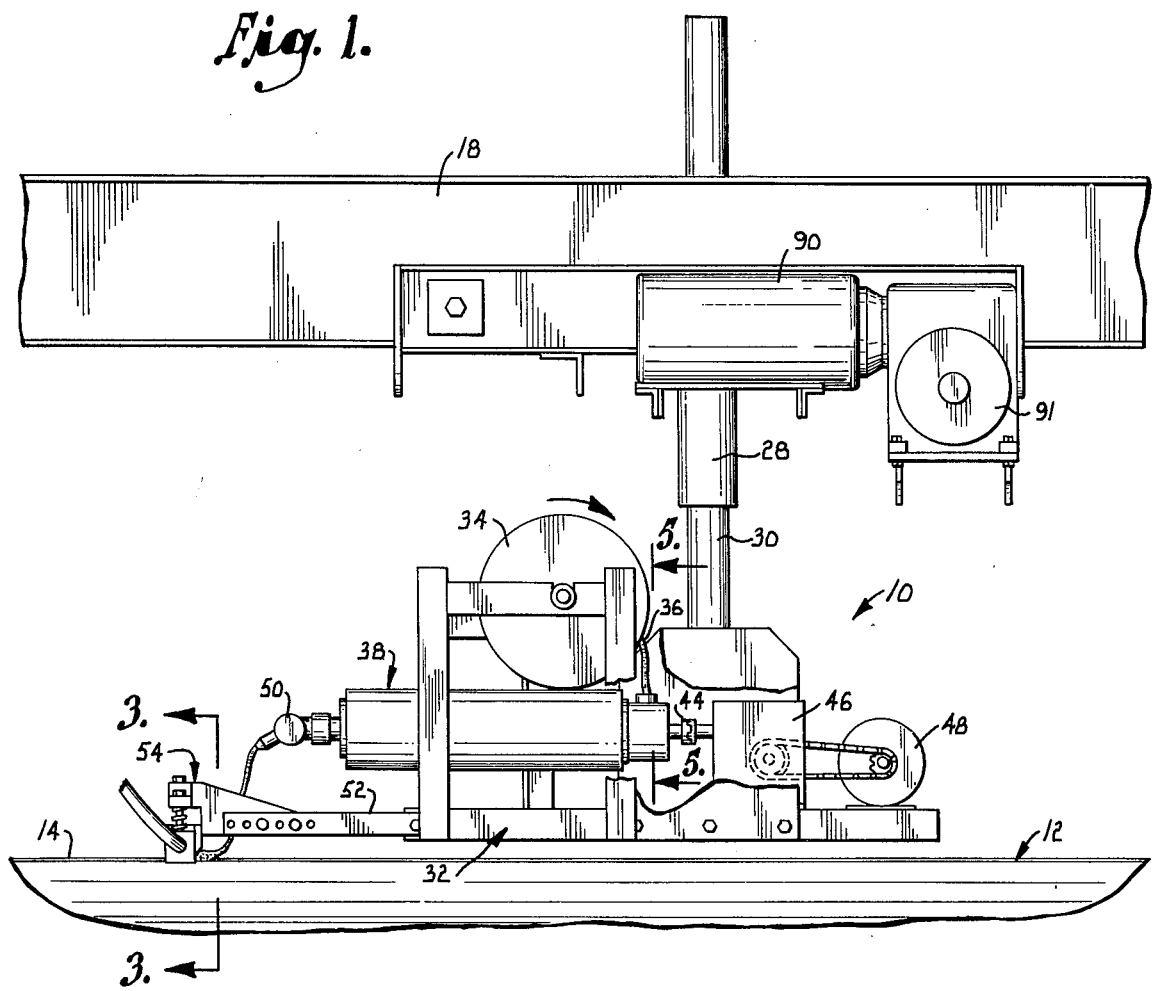
FIG. 1 is a side elevational view of the device for coating the area adjacent the weld bead illustrating the manner in which the mastic material is deposited in the area.
Figure 2:
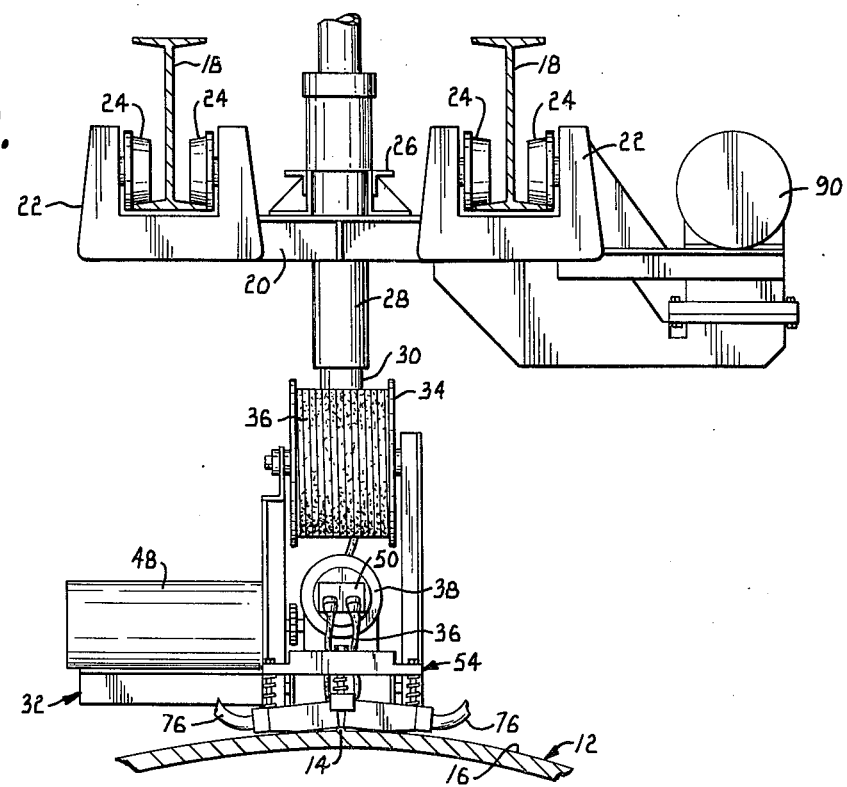
FIG. 2 is a front elevational view of the device illustrated in FIG. 1.

Referring initially to FIGS. 1 and 2 of the drawings, the device of the present invention is designated generally by the numeral 10. A length of pipe designated generally by the numeral 12 is disposed in a generally horizontal position. The pipe is of large diameter and is characterized by a curvilinear weld bead 14 which extends the length of the pipe. Weld bead 14 projects above surface 16 of pipe 12 by up to about ½ inch (see FIG. 3).

A pair of I-beam supports 18 are disposed in parallel relationship to each other and to the weld bead 14. I-beams 18 are also disposed in vertically spaced relationship to the weld bead. A framework platform comprises a plurality of horizontally disposed cross bars 20 which rigidly mount two parallel U-channel frames 22. U-channel frames 22 in turn mount rollers 24 which track along the flanges of the I-beams 18. It will be appreciated that there are at least four pair of rollers 24, even though only two pair are illustrated in the drawings. Cross bars 20 also mount a collar 26 which in turn receives a stanchion sleeve 28. Sleeve 28 rotatably mounts a stanchion tube 30 which may also be moved vertically within the sleeve.

Stanchion tube 30 mounts a lower framework designated generally by the numeral 32. Mounted on lower framework 32 is a spool 34 onto which is wound a length of mastic coating material 36 in rope form. The spool is immediately above an extruder 38 having a throat opening 40 (FIG. 5) for receiving the mastic material 36. A screw 42 within the extruder housing is driven through a clutch drive 44 and a gear box 46 by an electric motor 48 or other prime mover. Extruder 38 is provided with appropriate heating elements (not shown) so as to maintain the mastic material at an elevated temperature for extrusion puposes. The extruder 38 is provided with a dual orifice nozzle 50 which will cause two uniform quantities of the mastic material 36 to be deposited onto surface 16 simultaneously.

An extension section 52 of framework 32 mounts a doctor blade assembly designated generally by the numeral 54. Details of the doctor blade assembly 54 are illustrated in FIGS. 3 and 4. Doctor blade assembly 54 includes a mounting block 56 which is rigid with section 52 of the framework. Block 54 supports bolts 58, 60 and 62 in a manner to permit vertical movement of the bolts within the block. The bolts in turn mount two heating blocks 64 and 66, each of which contains first and second heating elements 68 and 70. Current is supplied to the respective heating elements 68 and 70 through lead wires 72 and 74 contained in conduit 76. Bolt 60 is rigid with a yoke 78 which pivotally receives one end of each of blocks 64 and 66. Coil springs 80-84, respectively, are disposed on bolts 58-62, respectively to bias blocks 64 and 66 downwardly. It will be appreciated, however, that blocks 64 and 66 may move upwardly against the action of the springs. Each of blocks 64 and 66 mounts a doctor blade element 86 which is preferably formed of hardened tool steel. Also mounted on yoke 78 in backing relationship to the blade elements 66 is a blade member 88 which is designed to ride along the apex of weld bead 14.

Again referring to FIG. 1 of the drawing, an electric motor 90 is provided for driving rollers 24 along I-beams 18 through the facility of gear box 91. Appropriate limit switches may be incorporated to assure that the device does not move past the ends of the beams.

In operation, the device 10 is disposed in alignment with the weld bead 14 of pipe 12. Motor 48 operates the screw extruder to draw the mastic material 36 from spool 34 and into the extruder throat. Motor 90 is operated to move the device along the tracks presented by I-beams 18 in a left to right direction when viewing FIG. 1. As will be appreciated, uniform quantities of the mastic material are laid down on either side of weld bead 14. Immediately after the material is deposited on pipe surface 16 and while the material is still warm, doctor blade assembly 54 passes over the material to smooth it out, causing it to form a bridge between the apex of the weld bead and a point on the pipe surface adjacent the base of the weld bead. The spring loaded nature of the doctor blade assembly permits it to pass over minor imperfections in the pipe surface without adverse affect on the mastic material being applied. Since the assembly is movable vertically and spring biased downwardly, it may also accommodate minor out-of-round conditions to assure a continuous and uniform layer of bridging mastic material in the area adjacent the weld bead.

Although blade elements 86 and blade member 88 are formed from hardened tool steel, these components are also easily replaceable when wear causes surfaces to become inefficient. When the device 10 reaches the end of the length of pipe, limit switches (not shown) will stop motor 90 as well as extruder motor 48. The device may then be moved upwardly and rotated 180° so as to permit travel down the next length of pipe in the opposite direction. It will also be appreciated that the device may be moved manually along the pipe if it is not desired to operate motor 90.

We claim:

1. In the coating of external pipe surfaces characterized by a raised weld bead extending longitudinally of the surfaces, a method of applying filler material to the surface area which is adjacent the weld bead, said method comprising:
   extruding a quantity of the said material onto said area along a line in generally parallel relationship to said weld bead;
   effecting relative movement between the extruded material and the pipe;
   providing a doctor blade element extending from said raised weld bead to a point on said surface adjacent said area to thereby bridge the area, said element being mounted to pass over irregularities in its path; and
   effecting relative movement between said element and said pipe, said step being performed in trailing relationship to said extruding step whereby said material is spread evenly over said area regardless of characteristics of said surface and said weld bead.

2. A method as set forth in claim 1, wherein said extruding step includes the step of heating said material.

3. A method as set forth in claim 1, wherein said extruding step comprises extruding a quantity of said material on both sides of said weld bead simultaneously along lines generally parallel to said weld bead and wherein said step of providing a doctor blade element comprises providing an element on each side of said weld bead.

* * * * *